Figure 1:
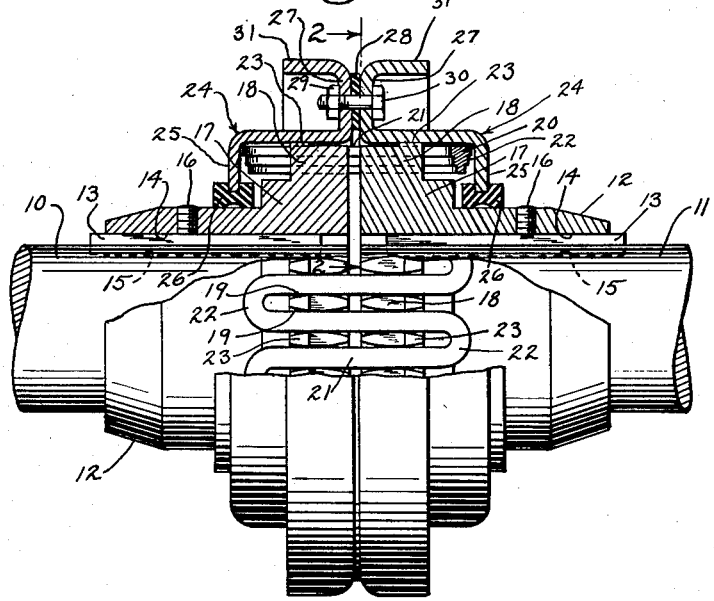

March 17, 1964 W. P. SCHMITTER 3,124,943
COUPLING
Filed Jan. 3, 1963 2 Sheets-Sheet 1

INVENTOR
WALTER P. SCHMITTER, DECEASED
BY A. LOUISE SCHMITTER
ROBERT V. ABENDROTH,
CO-EXECUTORS

BY Thomas W. Ehrmann

ATTORNEY

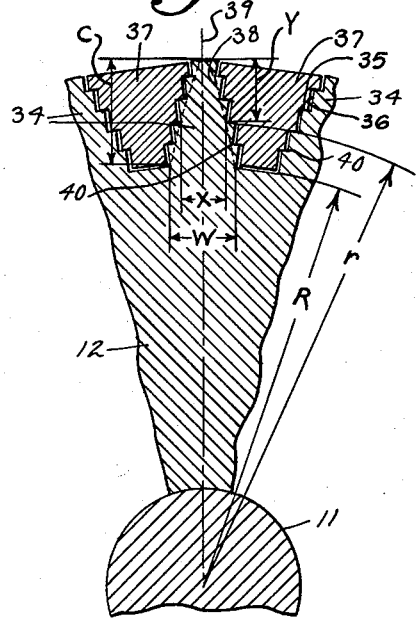
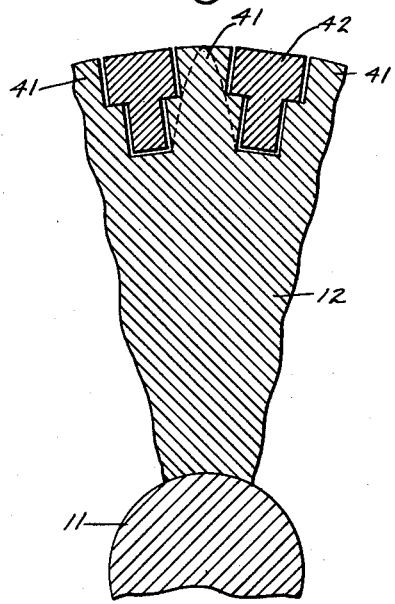
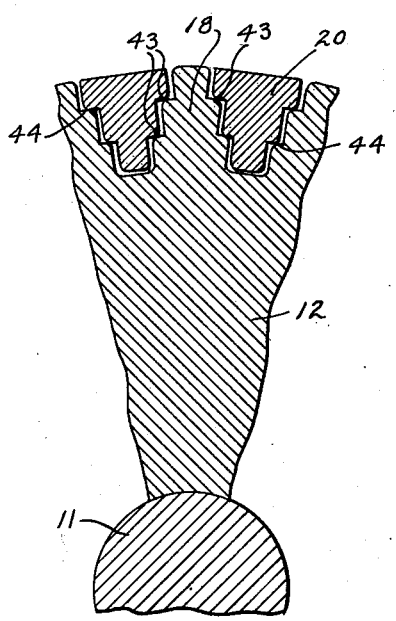

United States Patent Office  3,124,943
Patented Mar. 17, 1964

3,124,943
COUPLING
Walter P. Schmitter, deceased, late of Wauwatosa, Wis., by A. Louise Schmitter, Wauwatosa, and Robert V. Abendroth, Whitefish Bay, Wis., co-executors, assignors to The Falk Corporation, Milwaukee, Wis., a corporation of Wisconsin
Filed Jan. 3, 1963, Ser. No. 249,975
5 Claims. (Cl. 64—15)

This invention relates to flexible couplings of the type in which coupling hub members affixed to adjacent ends of the shafts to be coupled are provided with axially directed peripheral teeth which define slots adapted to receive resilient interconnecting grid members, and particularly resides in a coupling of such type in which the grid supporting teeth are provided with stepped side walls defining therebetween slots of progressively increasing width and in which the grid member is provided with side faces which match the stepped side walls of the teeth.

Flexible couplings comprised of hub members having spaced peripheral teeth and an interconnecting resilient grid member received between the teeth and forming a torque transmitting element between the hub members are preferably designed for the teeth to have greater load capacity than the resilient grid member. Accidental overloads on the coupling will then have the limited effect of causing failure of the less expensive and easily replaced grid member and the danger of damaging the coupling teeth is practically eliminated. However, in prior flexible couplings the provision of coupling teeth with greater load capacity than the grid member has often resulted in grid members of unnecessarily low capacity and considerable disparity between the respective load capacities of the teeth and the grid member. Specifically, in the common form of flexible coupling which utilizes grid members of rectangular cross section, the width of the grid member is limited by the distance between adjacent teeth at their roots, or radially inner dimension. Since a coupling tooth in this form of flexible coupling is weakest at its root, designing the teeth to withstand a given torque load has resulted in rectangular grid members of relatively small width and correspondingly small capacity.

It is a principal object of this invention to provide a flexible coupling in which the resilient grid members have increased torque transmitting capacity. The increase in capacity of the grid members over that available in prior couplings is effected through an increase in the total moment of inertia of the grid members and the moment of inertia is increased in such a way as not to reduce the torque carrying capacity of the coupling teeth. The increase in the strength of the grid members of flexible couplings of this invention without reducing the capacity of the teeth is accomplished by providing the teeth with stepped side walls which define slots therebetween of progressively increasing width in a direction radially outwardly of the center of the hub members. The width of the slot at each step level is maintained within definable limits so that the stress on the tooth at any given point on its surface will not exceed the stress at the root of the tooth and the capacity of the tooth is then governed by the root dimension which can remain unchanged over prior flexible couplings. The formation of the coupling teeth with stepped side walls permits the use of interconnecting grid members having side faces which match the configuration of the side walls of the teeth and the grid members of the coupling of this invention have increased moment of inertia as compared with the prior art.

The increased capacity of the grid member afforded by the coupling of this invention may also result in the ability to provide a coupling of a reduced size as compared with previous couplings having the same capacity in that a given cross sectional area of the grid member will yield greater capacity than heretofore available.

It is, therefore, another object of this invention to provide a flexible coupling in which the torque transmitting capacity of the grid member is increased without reducing the capacity of the coupling teeth.

It is a further object of this invention to provide a flexible coupling which permits reduction in the size of the coupling as compared with previous couplings of the same capacity.

It is also an object of this invention to provide a flexible coupling in which the physical interference between the grid member and the coupling teeth which is present during the assembly of the coupling is reduced.

The foregoing and other objects of this invention will appear in the description to follow. In the description, reference is made to the accompanying drawings which form a part hereof and in which there is shown by way of illustration specific forms in which this invention may be practiced. The forms will be described in detail to enable those skilled in the art to practice this invention but it is to be understood that other embodiments of the invention may be used and that structural changes to the embodiments described may be made by those skilled in the art without departing from the true scope of the present invention. Consequently, the following detailed description is not to be taken in a limiting sense and the scope of the present invention is best defined by the appended claims.

In the drawings:
FIG. 1 is a view in elevation and partly in section of a coupling in accordance with the teachings of this invention,
FIG. 2 is a partial view in elevation and section taken along the plane of line 2—2 of FIG. 1,
FIG. 3 is a view in perspective of a coupling tooth and a portion of a grid member of the embodiment of FIGS. 1 and 2,
FIG. 4 is a fragmentary sectional view through a hub showing the teeth thereof with grid members seated in the slots therebetween and illustrating another embodiment of this invention,
FIG. 5 is a fragmentary sectional view similar to FIG. 4 but illustrating a further embodiment of this invention, and
FIG. 6 is a fragmentary sectional view similar to FIGS. 4 and 5 and illustrating still a further embodiment of this invention.

Figure 2:
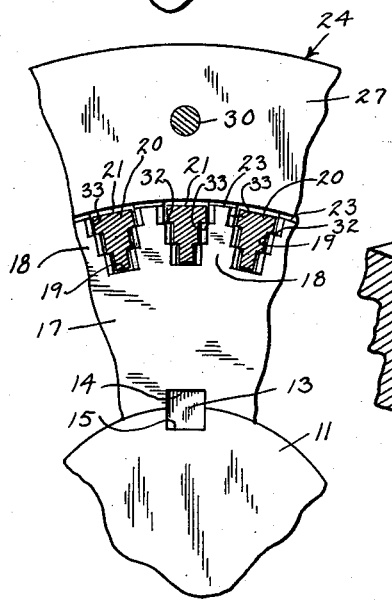
Figure 3:
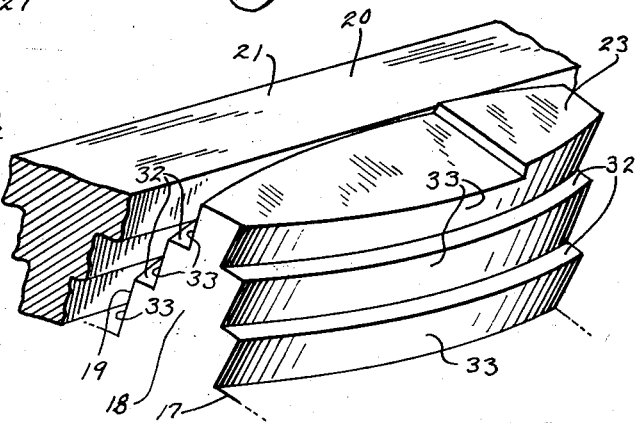

Referring now to the drawings, and specifically to FIGS. 1 and 2, there is shown therein a flexible shaft coupling connecting driving and driven shafts 10 and 11. The coupling includes two similar hub members 12 adapted to be connected in spaced relation upon the shafts 10 and 11. The hub members 12 are secured to the shafts 10 and 11 for rotation therewith by keys 13 which are received in cooperating keyways 14 provided in the hub members 12 and keyways 15 provided in the shafts 10 and 11. The keys 13 are restrained from axial movement by set screws 16.

Each hub member 12 includes a flange portion 17 disposed peripherally about that portion of the hub adapted to be placed in facing relation with the adjacent hub. The flange portions 17 are provided with a series of radially spaced, axially directed teeth 18 and the opposed side walls of adjacent teeth 18 define slots 19 therebetween. The slots 19 are adapted to receive an interconnecting grid member. While various types of grid members may be employed, a serpentine type grid member 20 having rungs 21 connected by integral end loops 22 is shown in the drawings for purposes of illustration.

The teeth 18 include raised cover supporting surfaces 23 which act as extensions of the flange portions 17. A suitable coupling cover is provided to prevent the entry of dust and grit to the working portions of the coupling, and also to act as a lubricant retainer housing for the coupling. The cover comprises two similar coupling cover members designated generally by the numeral 24. Each cover member 24 includes a radially bent, inwardly directed portion 25 which is seated in a suitable resilient sealing ring 26 disposed peripherally about the hub member 12. The sealing rings 26 are preferably formed of resilient material which is resistant to deterioration in the presence of lubricants. The cover members 24 also include radially bent, outwardly directed portions 27 which are adapted to be placed in spaced relation separated by a gasket 28. The cover members 24 are secured together by cooperating nuts 29 and bolts 30 received in suitable peripherally spaced holes provided in the bent portions 27 and in the gaskets 28. The cover members 24 terminate in axially directed bent portions 31 which cooperate to form a protective shield for the bolts 30 and nuts 29. As thus described, the cover members 24 are supported upon the hub members 12 by being seated in the resilient sealing rings 26 and by resting upon the cover supporting surfaces 23 of the teeth 18.

Referring also to FIG. 3, the side walls of the coupling teeth 18 are stepped with opposed side walls of adjacent teeth 18 generally diverging in a radially outwardly direction whereby the slots 19 are formed with progressively increasing widths. Each side wall of the teeth 18 is comprised of a series of level portions 32 and riser portions 33 which are normal to the level portions 32. The level portions 32 of corresponding steps in opposed side walls of adjacent teeth 18 lie in common planes which are normal to a radial line extending from the axis of a hub member 12 and through the center of a respective slot 19. The riser portions 33 of each side wall of the teeth 18 are formed as portions of a circular cylindrical surface, and the slots 19 between adjacent teeth are thereby provided with a greater width adjacent the inner face of the hub member 12 (see FIGS. 1–3).

As illustrated, the teeth 18 are symmetrical about radial axes and the slots 19 defined by the teeth 18 are likewise each symmetrical about radial axes. Each of the slots 19 have a cross section formed by a succession of rectangular elements of progressively increasing width in a direction radially outwardly of the respective hub member 12. The "width" of a slot 19, as used herein, is the dimension measured in a direction normal to the radial axis of the slot 19. The grid member 20 has a cross section substantially filling the slots 19 at the narrowest point between adjacent teeth 18. Accordingly, the grid member 20 has side faces which match the level portions 32 and riser portions 33 of the adjacent side walls of the teeth 18. Some clearance is preferably provided between the side faces of the grid member 20 and the riser portions 33 of side walls of the teeth 18.

When the coupling is subjected to a torque load, the grid member 20 will contact the side walls of the teeth 18 and act as a torque transmitting element between the hubs 12. As the torque load on the coupling increases the hub members 12 will assume an increased angular displacement relative to each other and will thereby cause the grid member 20 to advance its contact on the teeth 18 towards the inner faces of the hub 12. This produces the known function of decreasing the unsupported span of the rungs 21 of the grid member 20 as the load increases.

The grid member 20 of the coupling of this invention should be compared with the common rectangular cross section grid members, such as shown in Patent No. 2,027,842, issued January 14, 1936, to Walter P. Schmitter and Percy C. Day for "Coupling." For a given strength of coupling teeth 18, there will be no substantial difference in the dimension of each tooth 18 at its root. That is to say, the width of the teeth 18 of the coupling of this invention at their radially inner extremity will be substantially the same as that dimension for the teeth of a coupling utilizing a grid member having a rectangular cross section. In a coupling incorporating a rectangular grid member, the width of the grid member is determined by the dimensions of the tooth at its root. Thus, the width of a rectangular grid member of a coupling having comparable coupling tooth strength would be approximately that of the narrowest portion of the grid member 20. It will be readily seen that the addition of grid member material afforded by the coupling of this invention increases the moment of inertia of the grid member 20 about the radial axis of the grid member.

The increased moment of inertia results in a lower total stress in the grid member 20 for a given load than would be found in a rectangular grid member. Thus, the grid member 20 is capable of withstanding greater torque loads and, therefore, has increased capacity. As indicated previously, the increased capacity of the grid member 20 is accomplished without reducing the strength of the coupling teeth 18. This aspect of the invention will be discussed in reference to FIG. 4.

In FIG. 4 there is shown another embodiment of this invention in which coupling teeth 34 of the hub member 12 are provided with side walls having four steps, each step comprised of a level portion 35 and a riser portion 36 normal to each other as with the level and riser portions 32 and 33 of the embodiment of FIGS. 1 through 3. A grid member 37 has side faces which are stepped to match the configuration of the side walls of the teeth 34 with the provision of clearance between the side faces of the grid member 37 and the riser portions 36 of the teeth 34. A parabola indicated by a dotted line 38 is shown in FIG. 4 described upon the cross section of a tooth 34 at the widest portion of the tooth 34. The dotted line 38 represents the equal stress parabola for the coupling tooth 34 and is directed along the radial axis 39 of the tooth 34, with the vertex of the parabola 38 at the radially outer surface of the tooth 34 and with the parabola 38 passing through the ends of the root of the tooth 34. The equal stress parabola 38 is so named because it represents the points of equal stress in the tooth 34 under the most severe conditions of loading of the tooth 34. That is, a point load directed normal to radial axis 39 of the tooth 34 at its radially outer surface will produce the same stress at each point along the parabola 38 as exists at the critical root of the tooth 34. If a coupling tooth were formed with the cross sections exactly matching the parabola 38, under the extreme condition of point loading at the radially outer surface the coupling tooth 34 would be stressed equally at each point on its surface.

The steps formed in the side walls of the coupling teeth of this invention are limited by the equal stress parabola. That is, the equal stress parabola is the limit of penetration of each step in the side walls of the coupling teeth which can be made without reducing the capacity of the coupling tooth. As long as the steps do not extend to within the cross sectional area of the coupling tooth 34 contained within the parabola 38, no point of the coupling tooth 34 will be subjected to a greater stress than will exist at the root of the tooth 34.

While any increase in the moment of inertia of the grid members in the coupling of this invention will increase the capacity of such grid members under the torque loads to which they are subjected, maximum benefit is obtained by extending the steps in the side walls of the coupling teeth to the limit of the equal stress parabola for the tooth. The minimum width of each coupling tooth can be expressed mathematically by reference to the equal stress parabola. Specifically, the minimum width "$x$" at any level of the tooth 34 which is at a distance "$y$" from the outer surface of the tooth 34 may be expressed by the relationship $$x = w\sqrt{\frac{r-R}{c} + 1}$$

wherein "$w$" is the width of the tooth at its root, "$R$" and "$r$" are the radial distances from the axis of the hub member 12 to the root of the tooth and to the level of the tooth under consideration, respectively, and "$C$" is the height of the coupling tooth (see FIG. 4). From this relationship, the maximum width of the slot defined between adjacent teeth at any level can be closely approximated by the expression $$\frac{2\pi r}{N} - w\sqrt{\frac{r-R}{c} + 1}$$

wherein "$N$" is the number of teeth 34 on a hub member 12. The slight inaccuracy in this latter expression resulting from not discriminating between arc and chord distances yields a maximum slot width which is slightly smaller than that which is permissible and the negligible error is on the safe side. Taking the junctions 40 of the level and riser portions of the first step in the side walls of the teeth 34, as long as the distance between such junctions 40 does not exceed the width determined by the latter expression the coupling teeth 34 will be unaffected in their load capacity.

FIG. 5 illustrates still a further embodiment of the coupling of this invention wherein the coupling teeth 41 formed in the hub member 12 are provided with only one step in each side wall and the interconnecting grid member 42 is similarly provided with one step on each side face to substantially fill the slot defined between adjacent teeth 37. It will be seen that as long as the tooth material within the limits of the equal stress parabola of the tooth 41 is not removed, even a one step grid member 42 can exhibit increased capacity without reducing the capacity of the coupling teeth.

The coupling of this invention permits easier assembly of a serpentine grid member into the slots defined between adjacent teeth than is possible in flexible couplings which utilize grid members of rectangular cross section. In such prior couplings, interference from tooth edges made it necessary to distort the grid member appreciably during assembly. In the coupling of this invention, the initial insertion of the rungs of the grid member into the slots between the teeth can be accomplished without interference. The ease of assembly of the coupling may be further improved by rounding the projecting edges of the steps in both the grid member and coupling teeth. This is illustrated in FIG. 6 wherein a coupling similar to the embodiment of FIGS. 1–3 is shown with the projecting edges 43 of the steps formed in the side walls of the coupling teeth 18 and the projecting edges 44 in the stepped side faces of the grid member 20 are rounded. In this manner it is possible to practically eliminate interference between the rungs 21 of the grid member 20 and the coupling teeth 18.

It will be appreciated that the coupling of this invention provides an improved flexible coupling having grid members of increased capacity and that this is accomplished without affecting the capacity of the coupling teeth. A grid member of a coupling in accordance with this invention can have a smaller height and still exhibit the same torque transmitting capacity as the grid members of prior flexible couplings. Therefore, the present coupling can be built with a smaller overall diameter than prior couplings of the same capacity.

I claim:

1. A coupling for connecting driving and driven shafts comprising: a pair of hub members connectible to said driving and driven shafts for rotation therewith, each of said hub members including a plurality of axially extending and peripherally spaced teeth, said teeth each having stepped side walls which define therebetween slots having cross sections of progressively increasing width in a direction radially outwardly of the respective hub member; and a grid member received within said slots and forming a torque transmitting element between said hub members, said grid member having side faces which match the stepped side walls of said teeth.

2. A coupling for connecting driving and driven shafts comprising: a pair of hub members connectible to said driving and driven shafts for rotation therewith, each of said hub members including a plurality of axially extending and peripherally spaced teeth, said teeth each having stepped side walls which define therebetween slots symmetrical about radial axes, each slot having a cross section formed as a succession of rectangular elements of progressively increasing width in a direction radially outward of the respective hub member; and a grid member received within said slots and forming a torque transmitting element between said hub members, said grid member having side faces which match the stepped side walls of said teeth.

3. A coupling for connecting driving and driven shafts comprising: a pair of hub members connectible to said driving and driven shafts for rotation therewith, each of said hub members including a plurality of axially extending and peripherally spaced teeth, said teeth having side walls each provided with at least one step, each step being comprised of a level portion and a riser portion, opposing side walls of adjacent teeth defining slots therebetween which are symmetrical about radial axes and which have cross sections of progressively increasing width in a direction radially outwardly of the respective hub member, the level portion of each step extending inwardly into its respective tooth to the limit of a parabola described upon the cross section of such tooth and representing points of equal stress within such tooth; and a grid member received within said slots and forming a torque transmitting element between said hub members, said grid member having side faces which are stepped to match the side walls of said teeth.

4. A coupling for connecting driving and driven shafts comprising: a pair of hub members connectible to said shafts for rotation therewith, each hub member including a plurality of axially directed and peripherally spaced teeth, each of said teeth being symmetrical about a radial axis and extending radially outwardly from the respective hub member at the root of the tooth, said teeth each having side walls provided with a plurality of steps, each step extending into its respective tooth at each position along the axial length of the tooth to the limit of a parabola described upon the cross section of the tooth at such position, said parabola having its vertex at the radially outer surface and passing through the ends of the root of such tooth; and the grid member received between opposed side walls of adjacent teeth to form a resilient torque transmitting element between said hub members, said grid member having side faces provided with steps which match the steps in the side walls of said teeth.

5. A coupling for connecting driving and driven shafts comprising: a pair of hub members connectible to said shafts for rotation therewith, each hub member including a plurality of axially directed and peripherally spaced teeth which extend radially outward from the hub member at the roots of the teeth, said teeth having side walls each provided with a plurality of steps, opposing side walls of adjacent teeth defining slots having a width which increases progressively in a direction radially outwardly of the respective hub member, the width of said slots at each step not exceeding $$\frac{2\pi r}{N} - w\sqrt{\frac{r-R}{c} + 1}$$

wherein "N" is the number of teeth on the hub member, "R" is the radial distance from the axis of the hub member to the roots of teeth, "r" is the radial distance from the axis of the hub member to such step, "w" is the width of each tooth at its root, and "c" is the height of each tooth; and a grid member received within said slots and forming a torque transmitting element between said hub members, said grid member having side faces which are stepped to match the side walls of said teeth.

References Cited in the file of this patent
FOREIGN PATENTS 735,393    Germany _____ May 13, 1943

UNITED STATES PATENT OFFICE
CERTIFICATE OF CORRECTION

Patent No. 3,124,943                            March 17, 1964

Walter P. Schmitter, deceased, by A. Louise Schmitter
and Robert V. Abendroth, co-executors It is hereby certified that error appears in the above numbered patent requiring correction and that the said Letters Patent should read as corrected below.

Column 5, lines 4 to 6, the formula should appear as shown below instead of as in the patent:

$$x = w\sqrt{\frac{R-r}{c}+1}$$

same column 5, lines 16 to 19, and column 6, lines 73 to 75, the formulas, each occurrence, should appear as shown below instead of as in the patent:

$$\frac{2\pi r}{N} - w\sqrt{\frac{R-r}{c}+1}$$

Signed and sealed this 22nd day of December 1964.

(SEAL)
Attest:

ERNEST W. SWIDER                                    EDWARD J. BRENNER
Attesting Officer                                    Commissioner of Patents